3,316,087
PHOTOCONDUCTOR COATINGS FOR
ELECTROPHOTOGRAPHY
Johannes Munder and Oskar Sus, Wiesbaden-Biebrich,
Germany, assignors, by mesne assignments, to Azoplate
Corporation, Murray Hill, N.J.
No Drawing. Filed Oct. 21, 1960, Ser. No. 63,981
Claims priority, application Germany, Oct. 31, 1959,
K 39,057
14 Claims. (Cl. 96—1)

Inorganic materials such as selenium and zinc oxide have been used previously as photoconductor coatings for electrophotographic reproductions and recordings. Also, various organic compounds of lower molecular weight, such as anthracene, chrysene and benzidine, have been used for these purposes.

Photoconductor coatings for electrophotography have now been found which consist, at least in part, of a polymer of one or more aromatic and/or heterocyclic acrylic acid esters and/or α-alkyl-acrylic acid esters.

The polymeric acrylic acid esters and α-alkyl acrylic acid esters have the general formula

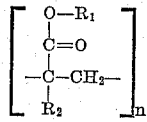

in which $R_2$ is hydrogen or a lower alkyl radical such as methyl, ethyl, propyl and butyl; $R_1$ an aryl radical such as phenyl, diphenyl, naphthyl, pyrene, phenanthrene, indene, anthracene, perylene, fluorene, fluorenone, and stilbene, or an aryl radical which may, for example, be substituted by groups such as lower alkyl, alkoxy, carbalkoxy, amino and substituted amino groups, or a heterocyclic radical such as quinoline, iso-quinoline, indole, acridine, carbazole, benzocarbazole, quinazoline, benzthiazole, benzimidazole, pyrrole, thioacridine and substitution products of these compounds, e.g., by alkyl, alkoxy, carbalkoxy, amino or substituted amino compounds, and in which $n$ is an integer greater than one. $R_1$ may be, for example, 5-hydroxy-1,2-naphthocarbazole, N-(hydroxymethyl)-carbazole, 9-hydroxyanthracene, 6-dimethyl-amino-2-(2' - hydroxyphenyl)benzthiazole or 2-hydroxy-anthracene.

The polymers of N-substituted aromatic and/or heterocyclic acrylic acid or α-alkyl-acrylic acid esters may be obtained by processes well known in the art, e.g., block polymerization, dispersion polymerization or suspension polymerization, with known radical-formers, such as peroxide or azo compounds, as catalysts.

For the preparation of the monomeric aromatic or heterocyclic acrylic acid or 2-alkyl-acrylic acid esters (Method A) one or more aromatic and/or heterocyclic compounds containing hydroxyl groups are dissolved in a suitable solvent such as dioxane, tetrahydrofuran, benzene, and the like, and 2 moles of an acid-binding substance, preferably a tertiary amine such as dimethyl aniline, pyridine, trimethylamine, N-ethylpiperidine, and the like are added. Then, with cooling, 1.5 moles of the acid chloride are slowly introduced, dropwise.

Alternatively, the acid chloride may be added first and the acid-binding agent slowly introduced, dropwise. The reaction mixture is then poured into ice water whereupon the ester separates out.

In the case of compounds which form a water-soluble alkali salt (such as α-naphthol, and the like), an aqueous alkaline salt solution of the compound can be prepared with 1.5 moles of sodium hydroxide (Method B). When the acrylic acid or α-alkyl acrylic acid chloride is added dropwise, the ester separates out immediately. In this way, the products obtained are often purer than is the case with Method A.

With both Method A and Method B it is possible for mixtures of several acid chlorides and mixtures of several hydroxyl compounds to be used.

Exemplary of the compounds which may be used in the present invention are:

FORMULA 1

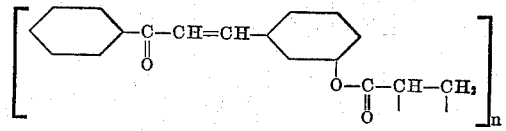

FORMULA 2

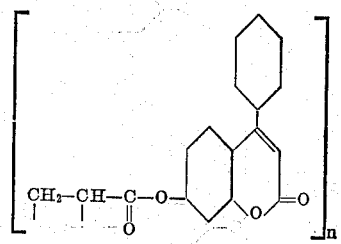

FORMULA 3

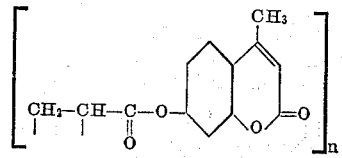

FORMULA 4

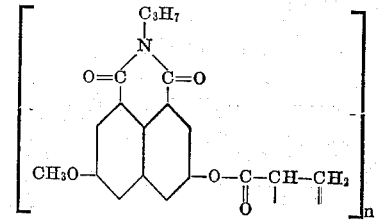

FORMULA 5
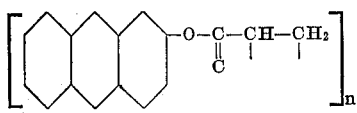

FORMULA 6
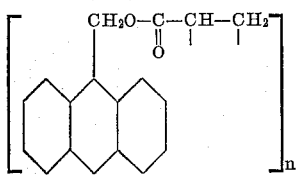

FORMULA 7
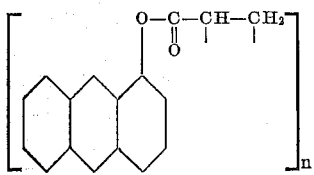

FORMULA 8
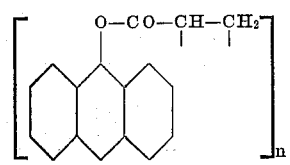

FORMULA 9
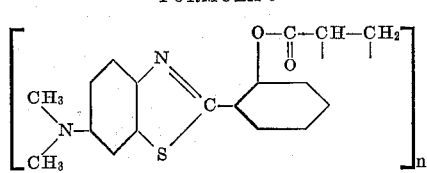

FORMULA 10
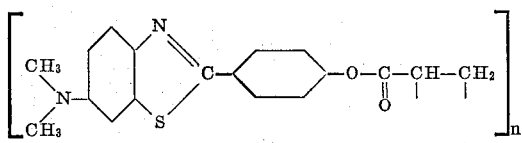

FORMULA 11
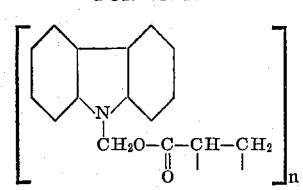

FORMULA 12
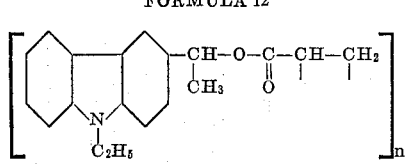

FORMULA 13
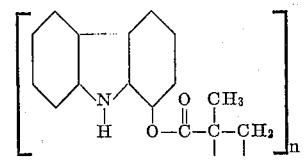

FORMULA 14
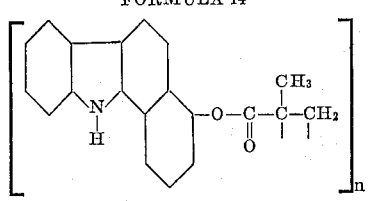

FORMULA 15
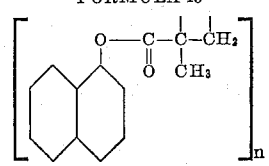

FORMULA 16
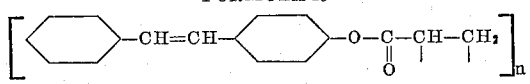

FORMULA 17
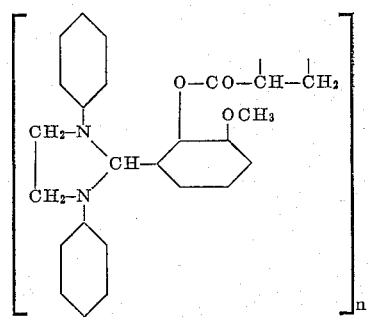

FORMULA 18
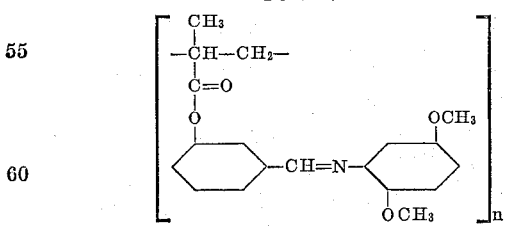

In the following list, the columns are as follows:
Column 1: the number of the polymeric compound in the list of formulae above,
Column 2: hydroxy compound,
Column 3: acid chloride,
Column 4: method of preparation (A or B),
Column 5: melting point of the monomeric ester, and
Column 6: softening range of the polymeric ester.

In the case of certain of the monomeric esters it was not possible for an exact melting point to be given as these compounds polymerized in the course of the preparation thereof.

| 1 | 2 | 3 | 4 | 5 | 6 |
|---|---|---|---|---|---|
| 1 | 1-(3'-hydroxy-phenyl)-2-benzoyl-ethylene. | Acrylic acid chloride | B | Resinous | 170–190° C. |
| 2 | 4-phenyl-7-hydroxy-coumarin. | do | A | 97–98° C | 100–120° C. |
| 3 | 4-methyl-7-hydroxy-coumarin. | do | A | 155–156° C | 180–190° C. |
| 4 | N-propyl-3-hydroxy-6-methoxy-naphthalic acid-imide. | do | A |  | 115–125° C. |
| 5 | 2-hydroxy-anthracene | do | B | 152° C | 200–245° C. |
| 6 | 9-(hydroxy-methyl)-anthracene. | do | A |  | 150–160° C. |
| 7 | 1-hydroxy-anthracene | do | B |  | 97–120° C. |
| 8 | 9-hydroxy-anthracene | do | A | 162° C | 105–175° C. |
| 9 | 2-(2'-hydroxy-phenyl)-6-dimethyl-amino-benzothiazole. | do | A | 88° C | 116–120° C. |
| 10 | 2-(4-hydroxy-phenyl)-6-dimethyl-amino-benzothiazole. | do | A |  | 113–125° C. |
| 11 | N-(hydroxy-methyl)-carbazole. | do | A | 192–194° C | 281–291° C. |
| 12 | N-ethyl-4-(1'-hydroxy-ethyl)-carbazole. | do | A | Oily | 43–140° C. |
| 13 | 2-hydroxy-carbazole | Methacrylic acid chloride | B | 170–172° C | 294–310° C. |
| 14 | 5-hydroxy-naphtho-carbazole. | do | A | 171–172° C | 188–191° C. |
| 15 | 1-naphthol | do | B | 34–35° C | Interpolymer with styrene 83–106° C. |
| 16 | 4-hydroxy-stilbene | Acrylic acid chloride | B | 106–107° C | 116–120° C. |
| 17 | 1,3-diphenyl-2-(2'-hydroxy-3-methoxy phenyl)-tetrahydroimidazole. | do | A | 117° C | 171–300° C. |
| 18 | 3-hydroxy-benzaldehyde 2',5'-dimethoxyanil. | do | A |  | Interpolymer with Compound 14 over 350° C. |

Depending upon the reaction conditions employed, e.g., temperature, solvent, type and quantity of the catalyst used, polymers of varying degrees of polymerization can be prepared. Compounds of this type, of comparatively high molecular weight, are generally resin-like and can be used without any binder as photoconductor coatings on supporting materials.

By the methods described above, interpolymers also can be prepared if more than one of the starting components are used. Also, it is possible for other compounds with polymerizable double bonds, particularly vinyl aromatic compounds such as styrene and vinyl carbazole, to be included in the polymer.

For the employment thereof as photoconductor coatings in electrophotography, the polymers described above are best dissolved in an organic solvent and coated upon a support, e.g., the solution is cast, painted or sprayed thereon and the solvent is then evaporated. The products can also be applied in the form of aqueous or non-aqueous dispersions.

The base materials used as supports may be any that satisfy the requirements of electrophotography, e.g. metal or glass plates, paper or plates or foils made of electroconductive resins or plastics, such as polyvinyl alcohol, polyamides, and polyurethanes. Other plastics which have the required electroconductivity, such as cellulose acetate and cellulose butyrate, especially in a partially saponified form, polyesters, polycarbonates, and polyolefins, if they are covered with an electroconductive layer or if they are converted into electroconductive materials, e.g. by chemical treatment with or by introduction of materials which render them electrically conductive, may also be used. Generally speaking, electroconductive supports are suitable for the purposes of the present invention. In the sense of the present invention, the term "electroconductive support" comprises materials having a specific conductivity higher than $10^{-12}$ ohm$^{-1}$·cm.$^{-1}$, preferably higher than $10^{-10}$ ohm$^{-1}$·cm.$^{-1}$.

In general, material having a specific resistance less than $10^{10}$ ohm cm. may be used. This does not exclude the use in special cases of supports with a higher specific resistance. Particularly in cases where apparatus capable of charging the electrocopying material on both sides, e.g., by double corona discharge, is used, e.g., that described in German Patent 1,030,183, supports with specific resistance considerably higher than $10^{10}$ ohm cm. may be used.

In general, however, supports with relatively high conductivity are preferred. The supporting material may be provided with an intermediate coating that has good conductivity and to which the photoconductor coating can then be applied.

It was unexpected that the polyacrylic acid esters would be photoconductive; this property makes them suitable for electrophotographic purposes. If they are applied to one of the supports listed above in a thin coating and then charged, e.g., by means of a corona discharge, and the negatively or positively charged coating is then exposed behind a master to light, preferably long-wave ultraviolet light of a wave length in the range of about 3600 to 4200 A., such as is emitted by high-pressure mercury vapor lamps, the charge is leaked away, in the parts affected by the light, after a very brief exposure, but is retained in the parts which the light does not strike. Thus, very good electrostatic-charge images are obtained, which can be converted into visible images corresponding to the master by powdering over with a pigmented powder having a charge of the opposite polarity. If the powder is fixed, e.g., by heating, permanent copies of the master can be obtained.

The sensitivity of the photoconductor coatings to visible light can be increased by the addition of optical sensitizers, in particular dyestuffs. In the following examples, the appropriate pages and numbers in the "Farbstofftabellen" of G. Schultz, 7th edition, 1931, vol. I, are quoted.

Triarylmethane dyestuffs such as Brilliant Green (No. 760, p. 314) Victoria Blue B (No. 822 p. 347) Methyl Violet (No. 783, p. 327), Ethyl Violet (No. 787, p. 331), Crystal Violet (No. 785, p. 329), Acid Violet 6B (No. 831, p. 351); xanthene dyestuffs, namely rhodamines, such as Rhodamine B (No. 864, p. 365), Rhodamine 6G (No. 866, p. 366), Rhodamine G Extra (No. 865, p. 366), Sulphorhodamine B (No. 863, p. 364) and Fast Acid Eosin G (No. 870, p. 368), as also phthaleins such as Eosin S (No. 883, p. 376), Eosin A (No. 881, p. 374), Erythrosin (No. 886, p. 376), Phloxin (No. 890, p. 378), Bengal Rose (No. 889, p. 378), and Fluorescein (No. 880, p. 373); thiazine dyestuffs such as Methylene Blue (No. 1038, p. 447); acridine dyestuffs such as Acridine Yellow (No. 901, p. 383), Acridine Orange (No. 908, p. 387) and Trypaflavine (No. 906, p. 386); quinoline dyestuffs such as Pinacyanol (No. 924, p. 396) and Cryptocyanine (No. 927, p. 397); quinone dyestuffs and ketone dyestuffs such as Alizarin (No. 1141, p. 499), Alizarin Red S (No. 1145, p. 502) and quinizarine (No. 1148, p. 504), and cyanine dyestuffs, e.g., Cyanine (No. 921, p. 394) and chlorophyll.

Also, a general increase in sensitivity can be achieved by the addition of small quantities of activators.

Such activators are organic compounds which are capable of acting as electron acceptors in molecule complexes of the donor/acceptor type ($\pi$-complex, charge transfer complex). They are compounds with a high electron affinity and are acids in the sense of Lewis' definition. A definition of Lewis acids is given in Kortüm's "Lehrbuch der Elektrochemie," 1948, p. 300. Compounds of this type have strongly polarizing radicals or groups, such as the cyano, nitro, keto, ester or acid anhydride groups, or acid groups such as carboxyl groups, or halogens such as chlorine, bromine and iodine, or the quinone configuration. Polarizing, electron-attracting groups of this type are described in the "Lehrbuch der organischen Chemie," by L. F. and M. Fieser, 1950, p. 651, Table I. As activators, substances with a melting point above room temperature are preferable, as the action of these substances remains unchanged even after prolonged storage, because of the low vapor pressure which they generally have. Compounds which are moderately colored such as quinones can be used, but those that are colorless or only weakly colored are preferable. Compounds with an absorption maximum in the ultraviolet region of the spectrum, i.e., below 4500 A. are also preferable. Further, the activator compounds should be of lower molecular weight, i.e., between about 50 and 5000, preferably between about 100 and 1000.

Examples of suitable activators acting as electron acceptors are: 1,2-dibromomaleic anhydride, chloranil, dichloroacetic acid, 1,2-benzanthraquinone, 2,4,7-trinitrofluorenone, 1,3,5-trinitro-benzene, tetrachlorophthalic anhydride, hexabromonaphthalic anhydride, and tetracyanoethylene.

Also, other additives, such as plasticizers, resins, e.g., ketone resins or pigments such as titanium dioxide, can be introduced.

For the preparation of electrophotographic images, the photoconductor coating is positively or negatively charged by means of a corona discharge of several thousand volts and is then exposed to light behind a master, or alternatively, an episcopic or diascopic image is projected thereon. The invisible electrostatic latent image thus obtained is developed by powdering over with a pigmented resin powder. By heating to temperatures at which the resin employed softens, i.e., about 100–150° C., preferably 110–125° C., the now visible and pigmented images can be fixed. Heating can be effected advantageously by means of infrared radiation and the fixing temperature can be reduced if the coatings are simultaneously exposed to vapors of agents which dissolve or swell the resins. Other than water, suitable solvents are halogenated hydrocarbons such as trichloroethylene or carbon tetrachloride, or saturated lower alcohols such as ethanol or propanol. By the method described above, images corresponding to the master with good contrast are obtained; these can also be used for the preparation of printing plates. For this purpose, the images are wiped over with a suitable solvent, wetted with water and inked up with greasy ink. In this way printing plates corresponding to the master are obtained from which copies can be produced in an offset machine.

The photoconductor coatings described above can be used both in reproduction processes and in measuring instruments for recording purposes, e.g., photographic recording instruments.

The photoconductor coatings used in the present process have the advantage that paper used as supporting material does not need to be impregnated to prevent penetration of the solvent. The photoconductor coatings can be applied in the form of solutions in organic solvents to base paper that has not been pretreated, as no significant penetration of the coating solution will occur. If transparent supporting material is used with the present process, images corresponding to the master can be obtained on a clear ground and these are excellently suited for further copying by any type of process. With the known material, such as selenium or zinc oxide there is a cloudiness of background which gives rise to unsatisfactory results in further copying processes.

The methods preferably employed for the preparation of the polymers of the acrylic acid and $\alpha$-alkyl-acrylic acid esters are described below by means of an example; the other compounds of this class can be prepared in the same manner. The necessary variations in experimental conditions, e.g., differing quantities of solvent, corresponding to differing solubility characteristics, and also differing quantities of catalyst, are matters comprehended by those skilled in the art.

The invention will be further illustrated by reference to the following specific examples:

*Example 1a*

The preparation of the monomeric acrylic acid esters by Method A is practiced particularly in the case of those compounds which do not form water-soluble alkali salts or, like coumarins, azomethines or tetrahydroimidazoles, undergo decomposition in the presence of alkalis. For the preparation of the compound corresponding to Formula 6, 5 parts by weight of 9-(hydroxy-methyl)-anthracene (melting point: 155–157° C.) are dissolved in 50 parts by volume of anhydrous dioxane; 6.7 parts by volume of triethylamine are added and the mixture is cooled to 5–10° C. (3.9 parts by volume of pyridine can be used instead of the triethylamine with equal success). 0.5 part by weight of phenyl-$\alpha$-naphthylamine is added for stabilization and then a solution of 3.59 parts by volume of acrylic acid chloride in 20 parts by volume of anhydrous dioxane is slowly introduced, dropwise with stirring, over a period of 15 minutes. Stirring is continued for 20 minutes and then the mixture is allowed to warm slowly to room temperature; the reaction is completed when the mixture is neutral. The mixture is then poured into 500 parts by volume of ice water and the reaction product, which thereupon separates out, is filtered off. It has a not very sharply defined melting point of 105–119° C., a fact which is presumably due to the presence of small quantities of starting material. As these can be readily boiled out with methanol after polymerization, processing can be continued without further purification of this compound.

For the polymerization, 5.5 parts by weight of the above compound are dissolved in 75 parts by volume of dioxane. About one thousandth part by weight of azoisobutyric acid nitrile is added and the mixture is boiled for 2 hours under reflux. After it has cooled, it is poured into 1000 parts by volume of ice water and the practically colorless material which then separates out is filtered off. It is suspended in 25 parts by volume of methanol and boiled for 10 minutes under reflux. The liquid is then decanted hot from the undissolved resin, which solidifies again as it cools. This product, which softens at 105° C. and melts at 150–160° C., can be used for the preparation of electrophotographic coatings. This process can be used, generally, for the preparation of all the compounds given in the list of formulae, but it is particularly advantageous in the case of the compounds corresponding to Numbers 2, 3, 4, 6, 8, 9, 10, 11, 12, 14 and 17.

Example 1b

For the preparation, by Method B, of the compound corresponding to Formula 1, 25 parts by weight of 1-(3'-hydroxy-phenyl)-2-benzoyl-ethylene are dissolved in 200 parts by volume of water containing 8.95 parts by weight of sodium hydroxide. The solution is cooled to 5–8° C. and then a solution of 16.7 parts by volume of acrylic acid chloride in 30 parts by volume of anhydrous dioxane is slowly introduced, dropwise with stirring, over a period of 15 minutes. Stirring is continued for 30 minutes and then the mixture is allowed to warm slowly to room temperature. The liquid is then decanted from the honey-yellow resin, which is obtained in a yield of 23 parts by weight.

For the polymerization of the product, 20 parts by weight are dissolved in 300 parts by volume of dioxane. Five thousandths of a part by weight of azoisobutyric acid nitrile are added and the solution is boiled under reflux until the stage where a sample diluted with water does not show any oily or resinous consistency; this generally requires 1 to 3 hours. The cooled solution is poured into 100 parts by volume of distilled water and the colorless, flaky precipitate is filtered off. The dried precipitate is boiled twice with 200 parts by volume of methanol, to remove traces of low polymer substances or compounds of lower molecular weight. In this way, a colorless powder is obtained which softens at 170–190° C. and melts at 250° C. It can be used in accordance with the invention for the preparation of electrophotographic coatings.

The compounds with the Numbers 5, 7, 13, 15 and 16, in the list of formulae, are most advantageously prepared by this process.

Interpolymers, also, can be obtained by Method A (Example 1a) and by Method B (Example 1b) if a mixture of monomer is used as starting material. It is also possible for mixtures of acid chlorides or hydroxyl compounds to be used in the preparation of the monomers.

Example 2

0.75 part by weight of the compound corresponding to Formula 1 and 0.009 part by weight of tetranitrofluorene are dissolved in 15 parts by volume of dioxane and the solution is applied to a superficially roughened aluminum surface. After the solvent has evaporated, a firmly adherent coating remains on the surface of the foil. With the aluminum foil thus coated, a direct image is produced by the electrophotographic process. The dry coating is provided with a negative electric charge by a corona discharge produced from a charging device maintained at about 5000 volts. It is then exposed behind a master to a high-pressure mercury vapor lamp (125 watts) for 5 seconds and dusted over with a developer in known manner. The developer consists of tiny glass balls and a very finely divided resin/carbon black mixture known as the toner. The black-pigmented resin adheres to those portions of the coating not affected by the light during the exposure and an image corresponding to the master becomes visible. It is fixed by slight heating.

The developer consists of 100 parts by weight of glass balls of a grain size of 350–400μ and 2.5 parts by weight of a toner of a grain size of 20–50μ preferably 5–30μ. The toner is prepared by melting together 30 parts by weight of polystyrene, 30 parts by weight of modified maleic acid resin (e.g., Beckacite K105) and 3 parts by weight of carbon black (e.g., Peerless Black Russ 552). The melt is then ground and screened.

If a polarity of the electrical charge used is opposite to the polarity of the toner contained in the developer, images corresponding to the master characterized by good contrast effect are obtained. By changing the polarity of the corona discharge, it is also possible to obtain reversed images from the same master and with the same developer. However, it is preferred also to change from a positive master to a negative master, and vice versa, when changing the polarity in order to obtain the best results. This is an advantage over the inorganic photoconductors such as zinc or selenium, which can be charged with one polarity only to give good images.

Example 3

0.75 part by weight of the substance corresponding to Formula 4 is dissolved in 15 parts by volume of dioxane; 0.0055 part by weight of chloranil is added and the solution is applied to an aluminum foil. By the process described in Example 2, a very good image, free of background, can be obtained with a two-minute exposure. The addition of chloranil also produces a considerable increase in sensitivity in the case of the compounds corresponding to Formulae 2, 3, 8, 9, 13 and 15. With other compounds, various other activator additives have proved more suitable, e.g., tetranitrofluorene in the case of the compound corresponding to Formula 16, and hexabromonaphthalic anhydride, in the case of the compound corresponding to Formula 6.

Example 4

A solution of 0.005 part by weight of Rhodamine B extra in 0.5 part by volume of methanol is added to a solution containing 10 parts by weight of the compound corresponding to Formula 8 in 100 parts by volume of chloroform; this solution is coated upon paper and dried. On paper coated in this way, direct images are produced by the electrophotographic process. The material is exposed behind a master for one second to a 125-watt high-pressure mercury vapor lamp at a distance of about 30 cm. and is then dusted over with a resin powder pigmented with carbon black. The thus formed image corresponding to the master is heated slightly and thereby made permanent.

Example 5

A solution containing 0.75 part by weight of the compound corresponding to Formula 13 together with 0.005 part by weight of chloranil, in 15 parts by volume of dioxane, is applied to transparent paper. After evaporation of the solvent, the resin coating thus applied adheres firmly to the surface of the foil. On the foil thus coated, electrophotographic images can be prepared as described in Example 2. When this material is exposed behind a master to a 125-watt high-pressure mercury vapor lamp, at a distance of about 30 cm., about 10 seconds are required. The images produced are suitable, when fixed for use as copying masters for the production of duplicates on any type of light-sensitive coatings.

Example 6

0.5 part by weight of the compound corresponding to Formula 14 is dissolved in 15 parts by volume of methyl glycol and the solution is applied to an aluminum foil. After the solvent has evaporated, a coating remains which adheres firmly to the surface of the foil. With the coated aluminum foil, images can be prepared from masters electrophotographically in known manner. The exposure time under the conditions described in Example 2 is 30 seconds.

Example 7

The compound corresponding to Formula 15 is polymerized as described in Examples 1a and 1b, but the same quantity by weight of styrene is added to the polymerization solution; the interpolymer is purified as described. 0.75 part by weight of this product is dissolved, together with 0.009 part by weight of chloranil in 15 parts by volume of methyl glycol and the solution is applied to an aluminum foil superficially roughened by brushing. After the solvent has evaporated, the polymerization product adheres firmly to the aluminum foil. As described in Example 2, images can be prepared electrophotographically. The exposure time, with a transparent master and a 125-watt high-pressure mercury vapor lamp at a distance of about 30 cm., is about 30 seconds. Very good background-free images are obtained from which paper transfer prints with excellent contrast effect can be obtained.

*Example 8*

0.75 part by weight of the compound corresponding to Formula 9 is dissolved in 15 parts by volume of ethyleneglycol monomethylether and the solution is applied to an aluminum foil. After the coating has dried, the foil is negatively charged by means of a corona discharge and then exposed behind a master for about 10 seconds to a 125-watt high-pressure mercury vapor lamp at a distance of about 30 cm. and then dusted over with a resin powder pigmented with carbon black. The image that becomes visible is fixed by heating.

*Example 9*

0.75 part by weight of the compound corresponding to Formula 11 is dissolved in 15 parts by volume of ethyleneglycol monomethylether and the solution is coated upon an aluminum foil. The further procedure described in Example 2 is followed and a latent electrostatic image is obtained after an exposure of about 5 seconds to a 125-watt high-pressure mercury vapor lamp at a distance of about 30 cm. This is made visible with a developer powder and then fixed, as already described.

*Example 10*

An interpolymer is made by copolymerizing two monomeric compounds, one of which monomers in polymerized state corresponds to Formula 18, whereas the other one after polymerization corresponds to Formula 14. In order to manufacture the interpolymer referred to above, 2.2 parts by weight of each monomers are dissolved together in 200 parts by volume of dioxane. 0.01 parts by weight of azoisobutyric acid nitrite is added and the solution is boiled for 2 to 3 hours under reflux. After 2 to 3 hours, a brownish precipitate begins to form on the sides of the vessel. The mixture is then allowed to cool and the small quantities of precipitated material are filtered off. The filtrate is then poured into 1000 parts by volume of ice water, with vigorous stirring. The greyish-brown precipitate is filtered off and dried; in this way, 4.3 parts by weight of the polymer is obtained. It sinters together between 320° and 350° C. without melting.

0.75 part by weight of this interpolymer is dissolved in 15 parts by volume of ethyleneglycol monomethylether and the resulting solution is coated upon an aluminum foil as described in Example 2. After the foil has dried, the coating is negatively charged by a corona discharge and then exposed behind a film master for 3 seconds to a 125-watt high-pressure mercury vapor lamp at a distance of 30 cm. The latent electrostatic image is made visible by means of a pigmented resin powder and then fixed by heating.

It will be obvious to those skilled in the art that many modifications may be made within the scope of the present invention without departing from the spirit thereof, and the invention includes all such modifications.

What is claimed is:

1. A photographic reproduction process which comprises exposing an electrostatically charged, supported photoconductive insulating layer to light under a master and developing the resulting image with an electroscopic material, the photoconductive layer comprising as a photoconductor a compound selected from the group consisting of linear polymers of aromatic esters of acrylic and α-alkyl acrylic acid.

2. A process according to claim 1 in which the photoconductive layer includes a compound selected from the group consisting of optical sensitizers and activators.

3. A photographic reproduction process which comprises exposing an electrostatically charged, supported photoconductive insulating layer to light under a master and developing the resulting image with an electroscopic material, the photoconductive layer comprising a compound having the formula

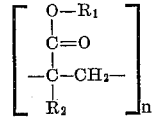

in which $R_2$ is selected from the group consisting of hydrogen and lower alkyl, $R_1$ is selected from the group consisting of aryl and heterocyclic groups, and $n$ is an integer greater than one.

4. A process according to claim 3 in which the photoconductive layer includes a compound selected from the group consisting of optical sensitizers and activators.

5. A photographic reproduction process which comprises exposing an electrostatically charged, supported photoconductive insulating layer to light under a master and developing the resulting image with an electroscopic material, the photoconductive layer comprising a compound having the formula

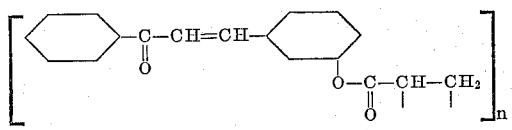

in which $n$ is an integer greater than one.

6. A photographic reproduction process which comprises exposing an electrostatically charged, supported photoconductive insulating layer to light under a master and developing the resulting image with an electroscopic material, the photoconductive layer comprising a compound having the formula

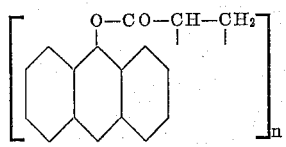

in which $n$ is an integer greater than one.

7. A photographic reproduction process which comprises exposing an electrostatically charged, supported photoconductive insulating layer to light under a master and developing the resulting image with an electroscopic material, the photoconductive layer comprising a compound having the formula

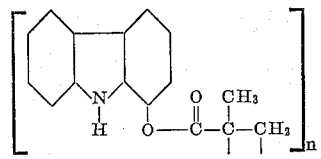

in which $n$ is an integer greater than one.

8. A photographic reproduction process which comprises exposing an electrostatically charged, supported photoconductive insulating layer to light under a master and developing the resulting image with an electroscopic material, the photoconductive layer comprising a compound having the formula

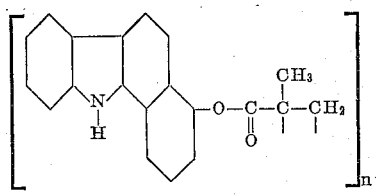

in which $n$ is an integer greater than one.

9. A photographic reproduction process which comprises exposing an electrostatically charged, supported photoconductive insulating layer to light under a master and developing the resulting image with an electroscopic material, the photoconductive layer comprising a compound having the formula

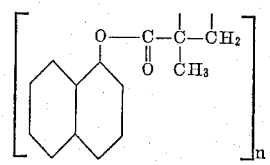

in which n is an integer greater than one.

10. A photographic reproduction process which comprises exposing an electrostatically charged, supported photoconductive insulating layer to light under a master and developing the resulting image with an electroscopic material, the photoconductive layer comprising a compound having the formula

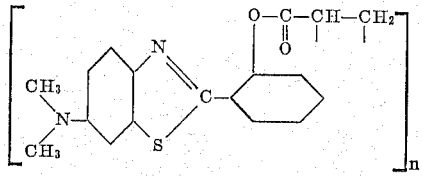

in which n is an integer greater than one.

11. A photographic reproduction process which comprises exposing an electrostatically charged, supported photoconductive insulating layer to light under a master and developing the resulting image with an electroscopic material, the photoconductive layer comprising a compound having the formula

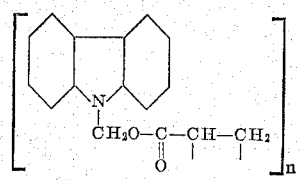

in which n is an integer greater than one.

12. A photographic reproduction process which comprises exposing an electrostatically charged, supported photoconductive insulating layer to light under a master and developing the resulting image with an electroscopic material, the photoconductive layer comprising an interpolymer of a compound having the formula

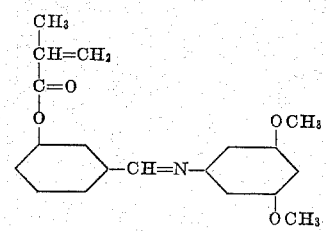

with a compound having the formula

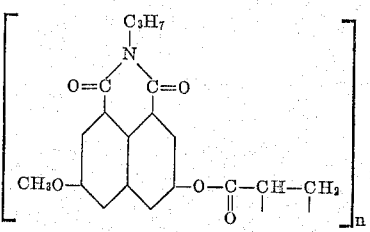

13. A photographic reproduction process which comprises exposing an electrostatically charged, supported photoconductive insulating layer to light under a master and developing the resulting image with an electroscopic material, the photoconductive layer comprising a compound having the formula in which n is an integer greater than one.

14. An electrophotographic reproduction process which comprises exposing an electrostatically charged photoconductive insulating material to a pattern of light and developing the resulting image with an electroscopic material wherein said photoconductive insulating material comprises a polymer of an aromatic ester of an acrylic acid.

References Cited by the Examiner

UNITED STATES PATENTS

| | | | |
|---|---|---|---|
| 2,129,685 | 9/1938 | Graves | 260—47 |
| 2,663,636 | 12/1953 | Middleton | 96—1 |
| 2,816,091 | 12/1957 | Smith et al. | 96—115 X |
| 2,824,084 | 2/1958 | Unruh et al. | 260—64 |
| 2,839,401 | 6/1958 | Gray et al. | 96—114 X |
| 2,861,060 | 11/1958 | Goode | 260—89.5 |
| 2,882,262 | 4/1959 | Smith et al. | 96—114 X |
| 2,956,878 | 10/1960 | Michiels et al. | 96—1 |
| 2,965,622 | 12/1960 | Pannell | 260—89.5 |
| 2,980,535 | 4/1961 | Schroeter | 96—1 |
| 3,026,307 | 3/1962 | Gorham et al. | 260—89.5 |
| 3,037,861 | 6/1962 | Hoegl et al. | 96—1 |
| 3,044,998 | 7/1962 | Emrick et al. | 260—89.5 |
| 3,072,479 | 1/1963 | Bethe | 96—1 |
| 3,097,095 | 7/1963 | Klupfel et al. | 96—1 |

FOREIGN PATENTS

| | | |
|---|---|---|
| 201,416 | 4/1956 | Australia. |
| 1,188,265 | 4/1959 | France. |
| 743,376 | 1/1956 | Great Britain. |

NORMAN G. TORCHIN, *Primary Examiner.*

PHILIP E. MORGAN, *Examiner.*

J. E. ALIX, C. E. VANHORN, *Assistant Examiners.*